J. BROWN.
CHURNS.
No. 182,800. Patented Oct. 3, 1876.
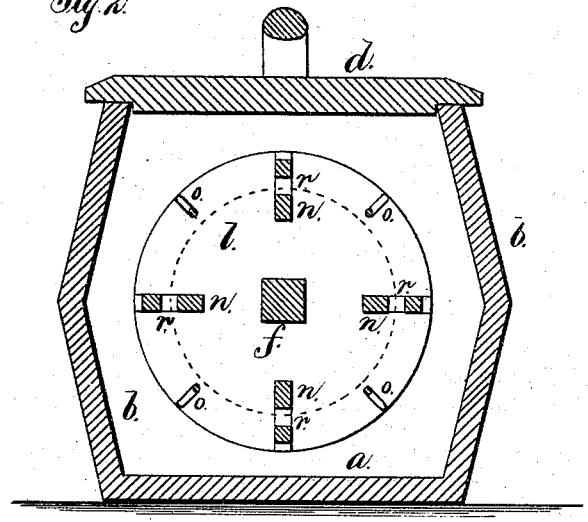
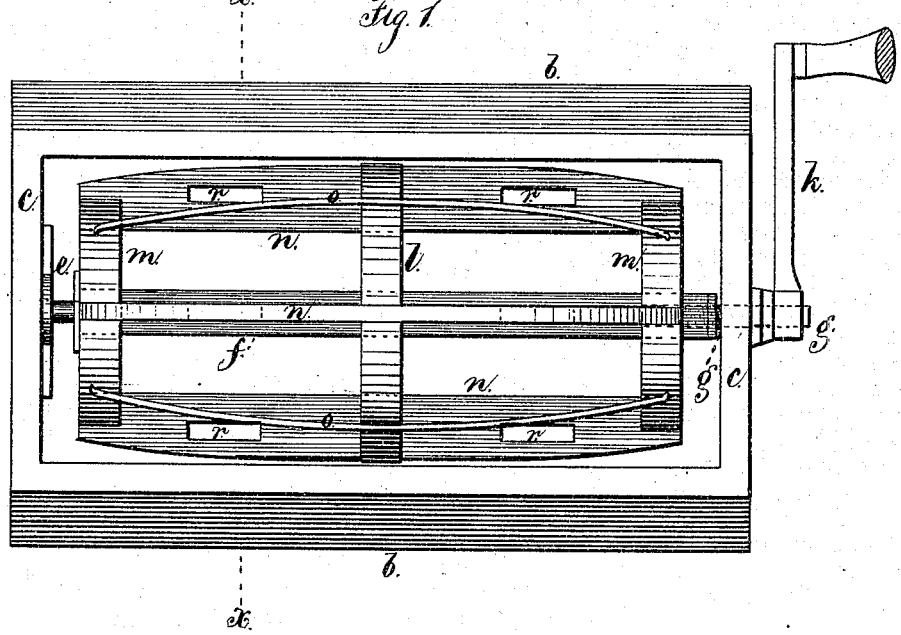

UNITED STATES PATENT OFFICE.

JOHN BROWN, OF LORAN, ILLINOIS.

IMPROVEMENT IN CHURNS.

Specification forming part of Letters Patent No. 182,800, dated October 3, 1876; application filed August 28, 1876.

*To all whom it may concern:*

Be it known that I, JOHN BROWN, of Loran, in the county of Stevenson and State of Illinois, have invented an Improvement in Churns, of which the following is a specification:

This invention relates to a rotary churn; and consists in a dasher upon a horizontal shaft made with buckets that are largest in the middle, and are supported by a central head in combination with longitudinal wires extending from the small end heads across the larger central head, and in the buckets there are openings. This dasher is placed horizontally in a box and revolved by a crank on the outside, and when in use the cream is circulated around by the revolving dasher, the same being thrown off at the central portion of the dasher and returning at the ends, and the wires cut and beat the cream in addition, so that the butter is separated more quickly than in churns heretofore in use.

In the drawing, Figure 1 is a plan view of the churn, with the cover removed, and Fig. 2 is a cross-section of the same at the line $x\,x$.

The box of the churn is made of the bottom $a$, sides $b\,b$, ends $c\,c$, and removable cover $d$. At one end, $c$, of the box is a bearing, $e$, for the pivot of the dasher-shaft $f$, and the other end of the box is perforated for the arbor $g$, that screws into the shaft $f$, so that said shaft $f$ and dasher may be removed when the arbor $g$ is taken out, and upon this arbor $g$ is the crank $k$, by which the dasher is revolved.

Upon the shaft $f$ is a central head, $l$, of as large a size as convenient for the box, and there are two smaller heads, $m\,m$, near the ends of the shaft $f$. The buckets $n\,n$ run longitudinally of the dasher, and there are three or four of them; each bucket is wider in the middle than it is at the ends, and they are received within notches in the heads. There are wires $o\,o$, extending the length of the dasher, placed intermediate to the buckets $n$, and attached, at their ends, to the heads $m\,m$. It is preferable to have openings or notches through the buckets $n$, as at $r$. When cream is placed in the churn and the dasher revolved the material is powerfully agitated, and the wires cut and separate the cream. At the same time there is a general circulation of the whole of the material in the churn produced by the central portion of the dasher, being the largest, and throwing off the cream, causing its return at the ends of the dasher, thus effecting a rapid separation of the butter.

I claim as my invention—

The rotary churn-dasher, made with the end heads $m$, and larger central head $l$, and with the longitudinal buckets, and intermediate wires, as and for the purposes set forth.

Signed by me this 8th day of August, A. D. 1876.

JOHN BROWN.

Witnesses:
WM. TUMBOR,
ROBT. H. WILES.